Patented July 23, 1946

2,404,763

UNITED STATES PATENT OFFICE 2,404,763

FLAVORING MATERIALS FOR GELATINS

Kenneth M. Gaver, Columbus, Ohio, assignor, by mesne assignments, to The Ohio State University Research Foundation, Columbus, Ohio, a corporation of Ohio No Drawing. Application August 1, 1940, Serial No. 349,299

1 Claim. (Cl. 99—140)

My invention relates to flavoring materials, and more particularly to flavoring products for gelatin, gelatin powders, jellies and the like.

It is an object of this invention to provide an improved flavoring product whereby the distribution of the essential flavor throughout the gelatin or jelly is effected.

It is another object to provide a dry powdered flavoring material which is adapted to be incorporated in transparent gelatins, jellies and the like so as to flavor the same.

It is another object of this invention to incorporate in a flavoring extract an inert tasteless colloid carrier which acts to evenly distribute the flavoring material when introduced into the food to be flavored.

It is another object to provide a dry powdered flavoring material comprising a colloidal dextrin material which is added to the flavoring extract of the desired strength so that the flavoring extract coats the surface of the colloidal powder which acts as a carrier for the flavor.

It is another object to coat the colloidal carrier particles with a flavoring material which is water insoluble, the colloidal material comprising numerous granules composed of sacks which protect the crystalline structure within the sack from the absorption of moisture whereby when the sack is ruptured in the presence of water it will absorb many times its weight of water and distribute the flavor throughout the product in which it is mixed.

It is a further object to prepare powdered flavoring which has the same potency of flavor or higher than the conventionally used extract from which the powdered flavoring product is made.

Another object of this invention is to utilize colloidal dextrin, preferably rice, to act as the stabilizer and prevent lumping of the powdered flavor. This colloidal material is substantially tasteless and is composed of numerous granules consisting of sacks containing crystals which, when introduced in water, will absorb approximately ten times their weight of water. The flavoring concentrate is incorporated with the colloidal carrier coating the surface of the colloidal particles providing an efficient powdered flavoring material which is readily disseminated through the food uniformly flavoring it.

It is another object to provide a flavor coated dry colloidal powder which is particularly useful in flavoring transparent gelatins, jellies and like products.

It is an additional object to provide a flavoring material suitable for use in flavoring gelatins and similar food products wherein the powdered material will not only flavor the gelatin by an even distribution of flavoring films throughout the body of the gelatin but will accomplish this without discoloring the gelatin. Heretofore it has been noted that specks or discolorations often appear in conventionally flavored foods, particularly in vanilla extract flavoring, due to the fact that the vanilla bean particles constituting the water insoluble flavoring material are not uniformly and colloidally dispersed throughout the product.

In general, prior to my invention it has been common practice to incorporate flavors in food products by introducing extracts of the particular flavor desired, principally the alcoholic extracts. When this liquid flavoring material is introduced into the dry mix ingredients of the food, it tends to localize itself and form concentrated flavored parts throughout the mixture.

With the use of my powdered flavoring product of this invention, it is easy to effect a uniform distribution of the flavoring material throughout the food, since the colloidal particles forming the carrier for the flavor are readily dispersed throughout the mixture. When the mixture is introduced in water or liquid materials, the action of the powdered flavor becomes more effective in that mechanical mixing and homogenization customarily practiced bring about a thorough and uniform dissemination of the flavoring film throughout the aqueous mixture.

Process

In general, the process of making my powdered flavoring material comprehends the following typical procedure:

(1) The juice of fruits or vanilla bean extract is concentrated to approximately one-fourth of its volume by distilling the same in a vacuum at a maximum temperature of 70 degrees C. and preferably at about 60 degrees C.

(2) Sufficient sucrose is added to the concentrate of 1 to bring the total weight of the product back to from 80% to 85% of the original weight of the concentrate and the vacuum distillation and drying of the mixture continued until the product is substantially dry.

(3) There is then mixed therewith 15% to 20% by weight of rice dextrin to stabilize the product and prevent lumping of the mixture. Corn, wheat, or the like cereal dextrin may be used in place of rice as the colloidal carrier for the flavoring material.

(4) The powdered mixture of step 3 is ground to a powder of from 60 to 80 mesh fineness.

(5) The ground powdered mixture is screened and allowed to form a cake.

(6) After the screened material has set to a cake it is broken up, rescreened and packaged in air-tight containers.

In the process, as set out in the foregoing, for making my powdered flavoring material, it will be understood that the various juices and flavoring extracts may be utilized. Further, the grinding of the mixture to the desired mesh fineness is carried out in the usual manner of grinding and screening products of this character. The final product is preferably put up in air-tight containers to prevent the loss or deterioration of the flavor during storage of the product. Further, where the final product is hygroscopic it is necessary to package the flavoring material in hermetically sealed containers.

My invention contemplates the producing of powdered flavoring materials of any desired flavor. The process is adapted for making powdered flavoring products from the juice of fruits, extracts thereof or synthetic flavoring products. The basic flavor ingredient being concentrated to approximately the same proportions and similarly treated.

As a typical example of a formulation for making a vanilla flavor for "Jello," or similar gelatins, the following is an illustration:

Example I 200 parts by weight of vanilla extract is dehydrated in a vacuum at 60 degrees C. and under a vacuum of 20 inches until approximately 45 to 50 parts by weight of the oleoresin vanilla concentrate remains.

The viscous residue is then mixed with approximately 125 to 150 parts by weight of sugar to bring the final weight of the product back to approximately 200 parts by weight. Thereafter, the mixture is dried in a vacuum, as mentioned above, until substantially dry. Then 35 to 40 parts by weight of corn dextrin is introduced into the mixture and the materials ground in a ball mill to a fineness of from 60 to 80 mesh. The ground product is then screened and allowed to set-up to a cake form. Thereafter, it is broken up, rescreened and packaged in air-tight containers.

In the preparation of the above vanilla powdered flavoring material, according to my invention, the liquid vanilla extract utilized is made in the usual manner. As an example, in making one gallon of vanilla flavor, it is common practice to grind up one pound of vanilla beans and extract the same with alcohol to give one gallon of commercial vanilla. When this commercial vanilla extract is concentrated it will produce about four ounces of oleoresin vanilla.

Vanilla extracts having different concentrations may be used, but it is preferable to use a vanilla extract having the concentration of oleoresin vanilla, as set out above. Use may also be made of vanila extract modified with glycerin, fruit juice and the like, if desired. A pure vanilla flavor liquid may also be used comprising the following formula:

Oleoresin vanilla _____ounces__ 4
Alcohol _____pints__ 2
Water added to make a gallon.

The flavoring ingredients are dissolved in the alcohol before the water is added. The mixture is allowed to stand for three or four days and then filtered of sediment to provide a clear liquid vanilla flavoring product.

Some flavors need no concentration, as for example, orange, lemon and the like. Where the flavoring substance does not require concentration this step may be omitted.

Example II

Where use is made of true fruit extracts in place of vanilla, the commercial products may be used or the fruit juice extracts prepared by pressing the fruit peelings and kernels of the fruit of which it is desired to make an extract and the product distilled with diluted alcohol. This results in producing an extract having a richer aroma and flavor than when the fresh fruit alone is used. To the pressings there is added two or three times its weight of 70% to 80% alcohol and the product allowed to stand overnight and distilled until the distillate contains about 40% alcohol.

The extracts of various fruits, such as strawberry, peach, apple, grape, lemon, pineapple, etc., may be made as described and the liquid extract utilized in the preparation of my powdered flavoring material as described in Example I.

In the preparation of my powdered flavoring product different amounts of the colloidal material may be used as required to produce the desired dispersing results. It is comprehended in this invention that the colloidal carrier for distributing the flavor is an inert tasteless material which is hydrophylic in nature, the particles of the colloid being coated with flavoring material which does not bring about rupturing of the granules of the colloid until the application of water. The water, when added to the colloidal particles, is absorbed bringing about swelling and rupturing of the particles after the colloidal particles have been distributed throughout the composition which results in a thorough and complete distribution of the flavoring material throughout the product being flavored. This is the important feature of my invention which produces the unexpected improved flavoring property in my powdered flavoring material.

It is to be understood that the particular proportions of the ingredients, as set forth in the foregoing formulas and examples are merely typical and that varying amounts of the ingredients forming my flavoring powder may be employed depending upon the type of flavor and the use to which the material is subjected.

It will be also understood that it is desired to comprehend within this invention such modifications as come within the scope of the claim and which are required to adapt my invention to varying conditions and uses.

Having thus fully described my invention, what I claim as new and desire to secure by Letters Patent is:

As an article of manufacture, a powdered flavoring material comprising a flavoring concentrate carried by a hydrophylic colloidally dispersible substantially tasteless cereal particle comprising rice dextrin adapted to gel and absorb substantially ten times its weight of water at room temperature on contact with moisture.

KENNETH M. GAVER.